United States Patent
Bousché et al.

(10) Patent No.: US 9,429,457 B2
(45) Date of Patent: Aug. 30, 2016

(54) NUCLEAR MAGNETIC FLOWMETER

(71) Applicant: Krohne AG, Basel (CH)

(72) Inventors: Olaf Jean Paul Bousché, Dordrecht (NL); Cornelis Johannes Hogendoorn, Spijk (NL); Marco Leendert Zoeteweij, Hendrik-Ido-Ambacht (NL)

(73) Assignee: Krohne AG, Basel (CH)

( * ) Notice: Subject to any disclaimer, the term of this patent is extended or adjusted under 35 U.S.C. 154(b) by 534 days.

(21) Appl. No.: 13/943,117

(22) Filed: Jul. 16, 2013

(65) Prior Publication Data

US 2014/0015526 A1 Jan. 16, 2014

(30) Foreign Application Priority Data

Jul. 16, 2012 (DE) .......................... 10 2012 013 933

(51) Int. Cl.
| | |
|---|---|
| *G01V 3/00* | (2006.01) |
| *G01F 1/716* | (2006.01) |
| *G01F 25/00* | (2006.01) |
| *G01F 1/74* | (2006.01) |
| *G01F 5/00* | (2006.01) |

(52) U.S. Cl.
CPC ................ *G01F 1/716* (2013.01); *G01F 1/74* (2013.01); *G01F 5/00* (2013.01); *G01F 25/0007* (2013.01)

(58) Field of Classification Search
USPC ........................................................ 324/306
See application file for complete search history.

(56) References Cited

U.S. PATENT DOCUMENTS

| | | | | | |
|---|---|---|---|---|---|
| 4,785,245 | A | * | 11/1988 | Lew ........................ | G01F 1/716 324/307 |
| 4,901,018 | A | * | 2/1990 | Lew ..................... | G01R 33/383 324/303 |
| 6,452,390 | B1 | * | 9/2002 | Wollin .................... | G01F 1/716 324/306 |
| 6,794,864 | B2 | * | 9/2004 | Mirotchnik ........... | G01R 33/44 324/303 |
| 2011/0001474 | A1 | * | 1/2011 | Miller ....................... | G01F 1/56 324/306 |
| 2012/0310553 | A1 | * | 12/2012 | Ong ........................ | G01V 3/32 702/49 |
| 2015/0338256 | A1 | * | 11/2015 | Hogendoorn .......... | G01F 1/716 324/306 |
| 2015/0354345 | A1 | * | 12/2015 | Meier ................... | E21B 47/102 73/1.16 |
| 2016/0011032 | A1 | * | 1/2016 | Hogendoorn ............. | G01F 1/74 324/306 |

* cited by examiner

*Primary Examiner* — Rodney Fuller
(74) *Attorney, Agent, or Firm* — David S. Safran

(57) ABSTRACT

A nuclear magnetic flowmeter with a measuring tube through which a multiphase medium can flow and which can be connected to an inlet tube which is located in the flow direction of the medium upstream of the measuring tube and to an outlet tube which is located in the flow direction downstream of the measuring tube. The nuclear magnetic flowmeter is, first of all, characterized essentially in that a medium bypass is assigned to the measuring tube, that the medium bypass includes a bypass tube, an inlet valve and/or an outlet valve and that, for a calibration operation, the bypass tube, on the one hand, can be connected to the inlet tube, and on the other hand, to the outlet tube, specifically via the inlet valve, via the outlet valve or via the inlet valve and via the outlet valve.

13 Claims, 1 Drawing Sheet

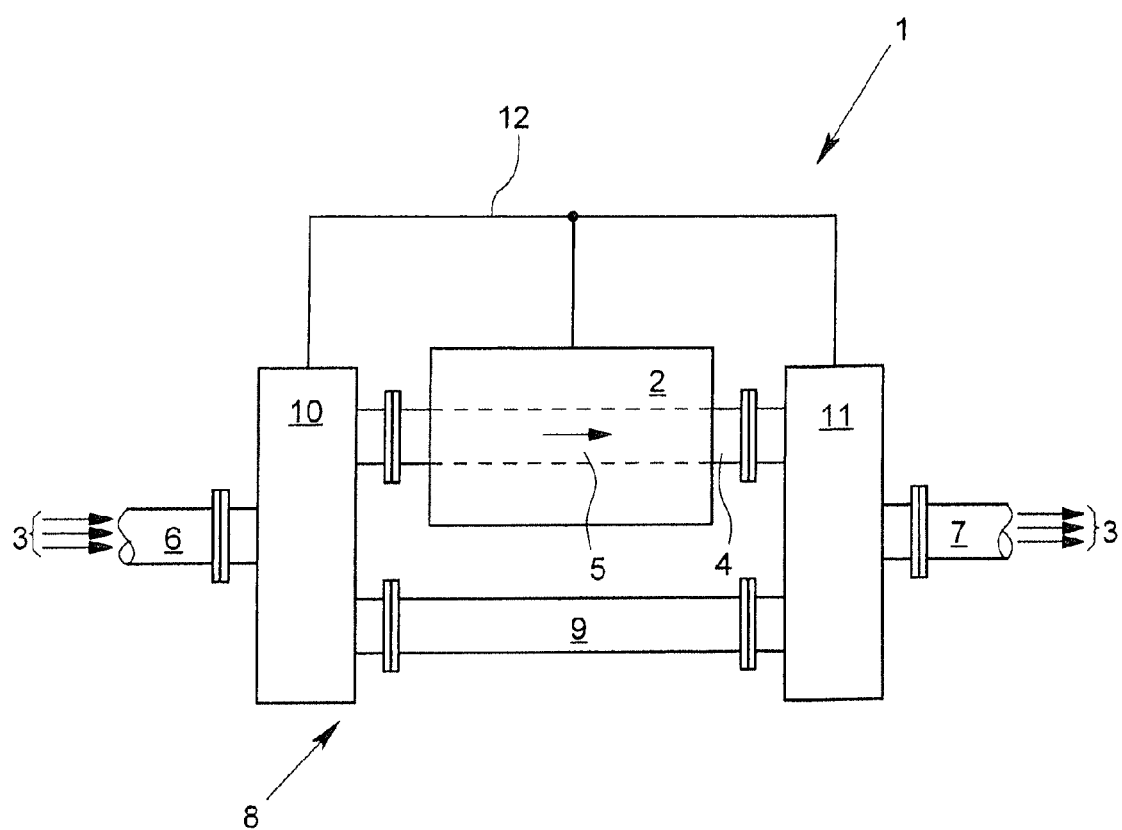

NUCLEAR MAGNETIC FLOWMETER

BACKGROUND OF THE INVENTION

1. Field of the Invention

The invention relates to a nuclear magnetic flowmeter; specifically, on the one hand, to a nuclear magnetic flowmeter with a calibration device, and on the other, to a calibration method for a nuclear magnetic flowmeter.

2. Description of Related Art

A nuclear magnetic flowmeter includes, first of all, as necessary for operation, a measuring tube through which a multiphase medium can flow and which can be connected to an inlet tube which is located in the flow direction of the medium upstream of the measuring tube and to an outlet tube which is located in the flow direction downstream of the measuring tube.

The atomic nuclei of the elements which have a nuclear spin also have a magnetic moment whish is caused by the nuclear spin. The nuclear spin can be construed as an angular momentum which can be described by a vector, and accordingly, the magnetic moment can also be described by a vector which is parallel to the vector of the angular momentum. The vector of the magnetic moment of an atomic nucleus in the presence of a macroscopic magnetic field is aligned parallel to the vector of the macroscopic magnetic field at the location of the atomic nucleus. The vector of the magnetic moment of the atomic nucleus precesses around the vector of the macroscopic magnetic field at the location of the atomic nucleus. The frequency of the precession is called the Larmor frequency $\omega_L$ and is proportional to the amount of the magnetic field strength B. The Larmor frequency is computed according to $\omega_L = \gamma \cdot B$. In the latter $\gamma$ is the gyromagnetic ratio which is maximum for hydrogen nuclei.

Measurement and analysis methods which use the property of the precession of atomic nuclei with a magnetic moment in the presence of a macroscopic magnetic field are called nuclear magnetic resonance measurement or analysis methods. Usually, the voltages induced by the precessing atomic nuclei under various boundary conditions in a sensor coil are used as the output variable for the measurement and analysis methods. One example for measuring instruments which use nuclear magnetic resonance are the nuclear magnetic flowmeters which measure the flow rate of the multiphase medium flowing through the measuring tube and analyze the medium.

The prerequisite for an analysis using nuclear magnetic resonance is that the phases of the medium which are to be analyzed can be excited to distinguishable nuclear magnetic resonances. The analysis can comprise the flow velocities of the individual phases of the multiphase medium and the relative proportions of the individual phases in the multiphase medium. Nuclear magnetic flowmeters can be used, for example, to analyze the multiphase medium extracted from oil sources, a medium which consists essentially of the phases crude oil, natural gas and salt water, all phases containing hydrogen nuclei.

The medium extracted from oil sources can also be analyzed with so-called test separators. They branch off a small part of the extracted medium, separate the individual phases of the medium from one another and determine the proportions of the individual phases in the medium. But, test separators are not able to reliably measure proportions of crude oil smaller than 5%. Since the proportion of crude oil of each source continuously drops and the proportion of crude oil of a host of sources is already less than 5%, it is not currently possible to economically exploit these sources using test separators. In order to also be able to exploit sources with a very small proportion of crude oil, correspondingly accurate flowmeters are necessary.

Nuclear magnetic flowmeters can meet the demands of a host of applications, such as, for example, in the measurement of the flow rate of the multiphase medium extracted from a source through the measuring tube and in the determination of the proportions of crude oil, natural gas and salt water in the medium. Proportions of crude oil less than 5% can also be measured with nuclear magnetic flowmeters.

So that nuclear magnetic flowmeters achieve the measurement accuracy which is necessary for many applications, calibration of the flowmeters in which the calibration parameters are determined is necessary. As in any other measuring instrument, in nuclear magnetic flowmeters repetition of the calibration is also necessary at regular time intervals in order to also continuously achieve the possible measurement accuracy. Calibration methods and calibration devices known from the prior art call for the flowmeter which is to be calibrated to be connected to a calibration device and to be calibrated by means of a calibration method.

The calibration device is made to produce various known flow rates of various media through the measuring tube of the flowmeter. Media can be single-phase or multiphase media with known proportions of the individual phases in the respective medium, especially the knowledge of the nuclear magnetic resonance properties of the media being necessary. A calibration method can comprise measurements by the flowmeter at different flow rates with different media. The calibration parameters of the flowmeter can be obtained from the measured values of the measurements and the pertinent known flow rates and properties of the media.

The disadvantage of the calibration methods and calibration devices known from the prior art is that the nuclear magnetic flowmeter which is to be calibrated must be dismounted from the measurement site at regular time intervals and transported to the calibration device, a process which is, on the one hand, complex and expensive and which, on the other, disrupts operation at the measurement site.

SUMMARY OF THE INVENTION

Therefore, a primary object of this invention is to devise a nuclear magnetic flowmeter in which the aforementioned disadvantages are eliminated, which is therefore less complex and expensive and in which the calibration which is necessary from time to time does not disrupt operation at the measurement site, therefore the actual flow rate measurement, or essentially does not disrupt it, and to devise a corresponding calibration method.

The nuclear magnetic flowmeter in accordance with the invention in which the aforementioned object is achieved is, first of all, characterized essentially in that a medium bypass is assigned to the measuring tube, that the medium bypass includes a bypass tube, an inlet valve and/or an outlet valve and that, for the calibration operation, the bypass tube, on the one hand, can be connected to the inlet tube, and on the other hand, to the outlet tube, specifically via the inlet valve, via the outlet valve or via the inlet valve and via the outlet valve.

In conjunction with the nuclear magnetic flowmeter in accordance with the invention, it is stated again and again below, that the medium bypass includes, in addition to the bypass tube, two valves, specifically an inlet valve and an outlet valve. But, the nuclear magnetic flowmeter in accordance with the invention is also serviceable when, as stated above, the medium bypass includes only one valve, therefore either an inlet valve—in the flow direction upstream of the measuring tube—or an outlet valve—in the flow direction downstream of the measuring tube. If the medium bypass in addition to the bypass tube includes only one inlet valve, therefore no outlet valve, the bypass tube on the outlet side is connected directly to the outlet tube. It applies conversely to the case that the medium bypass in addition to the bypass tube includes only one outlet valve, therefore no inlet valve, then the bypass tube is connected on the inlet side directly to the inlet tube.

The nuclear magnetic flowmeter in accordance with the invention can be embodied and developed in various ways.

It applies to a first preferred embodiment of the nuclear magnetic flowmeter in accordance with the invention that the medium bypass in "normal operation"—"normal operation" meaning measurement operation of the flowmeter— allows the medium to flow from the inlet tube via the inlet valve into the measuring tube and from the measuring tube via the outlet valve into the outlet tube and no medium flows past the measuring tube, therefore no medium flows via the medium bypass. Otherwise, an embodiment is recommended, especially in conjunction with what has been stated directly above, which is characterized in that the medium bypass in "special operation"—"special operation" meaning a calibration operation in which the flowmeter is calibrated—allows the medium to flow from the inlet tube via the inlet valve which is set for calibration operation into the bypass tube and from the bypass tube via the outlet valve which is set for calibration operation into the outlet tube, therefore no medium flows through the measuring tube.

Finally, it is recommended that, in the nuclear magnetic flowmeter in accordance with the invention, for control of the inlet valve of the medium bypass and the outlet valve of the medium bypass, a control be provided in the flowmeter and the control be connected, on the one hand, via a control line to the inlet valve, and on the other hand, via a control line to the outlet valve.

In conjunction with the nuclear magnetic flowmeter in accordance with the invention, it has been stated again and again above that the medium bypass includes, in addition to the bypass tube, two valves, specifically an inlet valve and an outlet valve. But the nuclear magnetic flowmeter in accordance with the invention is also serviceable when the medium bypass includes only one valve, therefore either an inlet valve—in the flow direction upstream of the measuring tube—or an outlet valve—in the flow direction downstream of the measuring tube.

It was stated initially that the invention relates to a nuclear magnetic flowmeter, but not only a nuclear magnetic flowmeter as such, but also a calibration method for a nuclear magnetic flowmeter.

According to the method, the aforementioned object for a nuclear magnetic flowmeter, especially for a nuclear magnetic flowmeter in accordance with the invention, is first of all, characterized essentially in that the flowmeter can work, on the one hand, in "normal operation" as defined above, and on the other hand, in "special operation" as defined above.

If and to the extent the calibration method in accordance with the invention is used in conjunction with the nuclear magnetic flowmeter in accordance with the invention, one preferred embodiment is characterized in that in "normal operation" the medium is routed from the inlet tube via the inlet valve of the medium bypass into the measuring tube and from the measuring tube via the outlet valve of the medium bypass into the outlet tube and that in "special operation" the medium is routed from the inlet tube via the inlet valve of the medium bypass into the bypass tube and from the bypass tube via the outlet valve of the medium bypass into the outlet tube.

Each calibration method includes the taking of measurements in order to be able to improve the measurement accuracy of the actual flow rate measurement with the measured valves which have been obtained in doing so. Consequently the calibration method in accordance with the invention normally also includes the fact that "in special operation" measurements on the medium standing in the measuring tube are taken by the flowmeter. The measurements taken on the medium standing in the measuring tube will then be used to increase the accuracy of the measurements taken on the medium in the measuring tube.

In the calibration method in accordance with the invention, on the medium standing in the measuring tube, different parameters can be determined, especially the spin-lattice relaxation time of each of the phases of the medium, the spin-spin relaxation time of each of the phases of the medium, the volumetric proportion of each of the phases of the medium and/or the mass proportion of each of the phases of the medium. In particular, the mass proportion of each of the phases of the medium can be determined from the characteristic of the spin-lattice relaxation signal over time and/or from the characteristic of the spin-spin relaxation signal over time.

In particular, there are various possibilities for embodying and developing the nuclear magnetic flowmeter and the calibration method in accordance with the invention. In this respect reference is made the detailed description of the exemplary embodiment below in conjunction with the accompanying FIGURE of the drawings.

BRIEF DESCRIPTION OF THE DRAWING

The sole FIGURE is a schematic depiction of an exemplary embodiment of a nuclear magnetic flowmeter in accordance with the invention with a calibration device.

DETAILED DESCRIPTION OF THE INVENTION

The nuclear magnetic flowmeter 2 includes a calibration device 1, and a measuring tube 4 through which a multiphase medium 3 can flow. The measuring tube 4 can be connected to an inlet tube 6 located 3 upstream of the measuring tube 4 in the flow direction 5 of the medium and to an outlet tube 7 located downstream of the measuring tube 4 in the flow direction 5 of the medium 3. If the measuring tube 4 is connected both to the inlet tube 6 and also to the outlet tube 7, the structure corresponds to a structure which is known from the prior art for measuring the flow rate and for analyzing the multiphase medium 3 which is flowing through the measuring tube 4 using the nuclear magnetic flowmeter 2.

The calibration device 1 which belongs to the nuclear magnetic flowmeter 2 comprises essentially a medium bypass 8 which includes a bypass tube 9, an inlet valve 10 and an outlet valve 11. The inlet valve 10 is connected to the measuring tube 4, the inlet tube 6 and the bypass tube 9, while the outlet valve 11 is connected to the measuring tube 4, the outlet tube 7 and the bypass tube 9.

In "normal operation" as defined above, the medium 3 flows from the inlet tube 6 via the inlet valve 10 into the measuring tube 4 and from the measuring tube 4 via the outlet valve 11 into the outlet tube 7. Therefore, all of the medium 3 flows through the measuring tube 4, and therefore, no medium 3 flows via the medium bypass 8. The nuclear magnetic flowmeter 2 can work "normally", therefore can work in "normal operation".

In "special operation" as defined above, calibration of the nuclear magnetic flowmeter 2 is performed and the medium 3 flows from the inlet tube 6 via the inlet valve 10 which is set for calibration operation into the bypass tube 9 and from the bypass tube 9 via the outlet valve 11 which is set for calibration operation into the outlet tube 7. Therefore, no medium 3 flows through the measuring tube 4. Rather, the medium 3 which is present in the measuring tube 4 stands "still", i.e., is motionless. The measurements necessary for the calibration method in accordance with the invention on the standing medium 3 which is enclosed in the measuring tube 4 can be taken by the flowmeter 2.

In the illustrated exemplary embodiment, the nuclear magnetic flowmeter 2 in accordance with the invention has control lines 12 to control the inlet valve 10 of the medium bypass 8 and the outlet valve 11 of the medium bypass 8. Of course, the control of the inlet valve 10 of the medium bypass 8 and the control of the outlet valve 11 of the medium bypass 8 can also take place by separate control means.

The inlet valve 10 of the medium bypass 8 and the outlet valve 11 of the medium bypass 8 are made such that the flow of the medium 3 in the inlet tube 3 and in the outlet tube 7 is not significantly adversely affected when changing from "normal operation" to "special operation" and vice versa. The "normal operation"=measurement operation of the flowmeter 2 is consequently adversely affected by the calibrations of the flowmeter 2 which are necessary from time to time only such an extent that no flow rate measurements and analyses of the medium 3 by the flowmeter 2 can be performed for short time intervals.

Proceeding from "normal operation", in the illustrated exemplary embodiment calibration begins with first the inlet valve 10 of the medium bypass 8 and the outlet valve 11 of the medium bypass 8 being set in such a way as "special operation" or calibration operation requires. In this way, as already stated, the flow of the medium 3 in the measuring tube 4 is stopped. Then, the spin-lattice relaxation time, the spin-spin relaxation time, the hydrogen index, the volumetric proportion and the mass proportion of each of the phases of the medium 3 in the measuring tube 4 are determined. Afterwards then the inlet valve 10 of the medium bypass 8 and the outlet valve 11 of the medium bypass 8 are set in such a way as is necessary for "normal operation" or measurement operation of the flowmeter 2 so that therefore the medium 3 can again flow into the measuring tube 4 and through the measuring tube 4.

What is claimed is:

1. A nuclear magnetic flowmeter, comprising:
   a measuring tube through which a multiphase medium is flowable, an upstream end of which is connectable to an inlet tube and a downstream end of which is connectable to an outlet tube, and
   a medium bypass connected to the measuring tube comprising a bypass tube, and at least one of an inlet valve and an outlet valve, thus
   wherein the flowmeter has a calibration operation mode in which the bypass tube is connected to the inlet tube and to the outlet tube and flow through the measuring tube is stopped for calibration of the flowmeter, all flow passing through the bypass tube, and
   wherein the flowmeter has a normal operation mode in which measurement operation of the flowmeter allows the medium to flow from the inlet tube via the inlet valve into the measuring tube and from the measuring tube via the outlet valve into the outlet tube and in which no medium by passes the measuring tube, there being no flow through the medium bypass.

2. The nuclear magnetic flowmeter in accordance with claim 1, wherein flowmeter further comprises a control for controlling of the at least one of the inlet valve and of the outlet valve of the medium bypass, the control being connected by a control line to said at least one of the inlet valve and an outlet valve.

3. The nuclear magnetic flowmeter in accordance with claim 1, wherein said at least one of the inlet valve and an outlet valve comprises both an inlet valve and an outlet valve, and wherein flowmeter further comprises a control for controlling of the inlet valve and the outlet valve of the medium bypass, the control being connected by a respective control line to each of said the inlet valve and said outlet valve.

4. A calibration method for calibrating a nuclear magnetic flowmeter having a measuring tube through which a multiphase medium flows into an upstream end which is connected to an inlet tube and out out of a downstream end which is connected to an outlet tube in a normal operation mode, and having a medium bypass connected to the measuring tube comprising a bypass tube, and at least one of an inlet valve and an outlet valve, comprising the steps of:
   switching the flowmeter from said normal operation mode to a calibration operation mode in which the bypass tube is connected to the inlet tube and to the outlet tube and
   causing flow through the measuring tube to be stopped for calibration of the flowmeter, all flow passing through the bypass tube,
   wherein the measurements taken on the medium standing in the measuring tube are used to increase the accuracy of measurements taken on the medium flowing in the measuring tube during said normal operation mode.

5. The calibration method in accordance with claim 4, wherein said at least one of the inlet valve and an outlet valve comprises both an inlet valve and an outlet valve, and wherein medium is caused to be standing motionless in the measuring tube during said calibration operation mode.

6. The calibration method in accordance with claim 5, wherein measurements on are taken by the flowmeter on the medium standing motionless in the measuring tube.

7. The calibration method in accordance with claim 6, wherein spin-lattice relaxation time is determined for each phase of the medium during said calibration operation mode.

8. The calibration method in accordance with claim 7, wherein the mass proportion of each phase of the medium is determined from a characteristic of a spin-lattice relaxation signal over time.

9. The calibration method in accordance with claim 6, wherein spin-spin relaxation time is determined for each phase of the medium during said calibration operation mode.

10. The calibration method in accordance with claim 6, wherein a volumetric proportion of each phase of the medium is determined during said calibration operation mode.

11. The calibration method in accordance with claim 6, wherein a mass proportion of each phase of the medium is determined during said calibration operation mode.

12. The calibration method in accordance with claim 6, wherein the calibration method is carried out at regular time intervals.

13. The calibration method in accordance with claim 4, wherein the mass proportion of each phase of the medium is determined from a characteristic of a spin-spin relaxation signal over time.

\* \* \* \* \*